Figure 1:
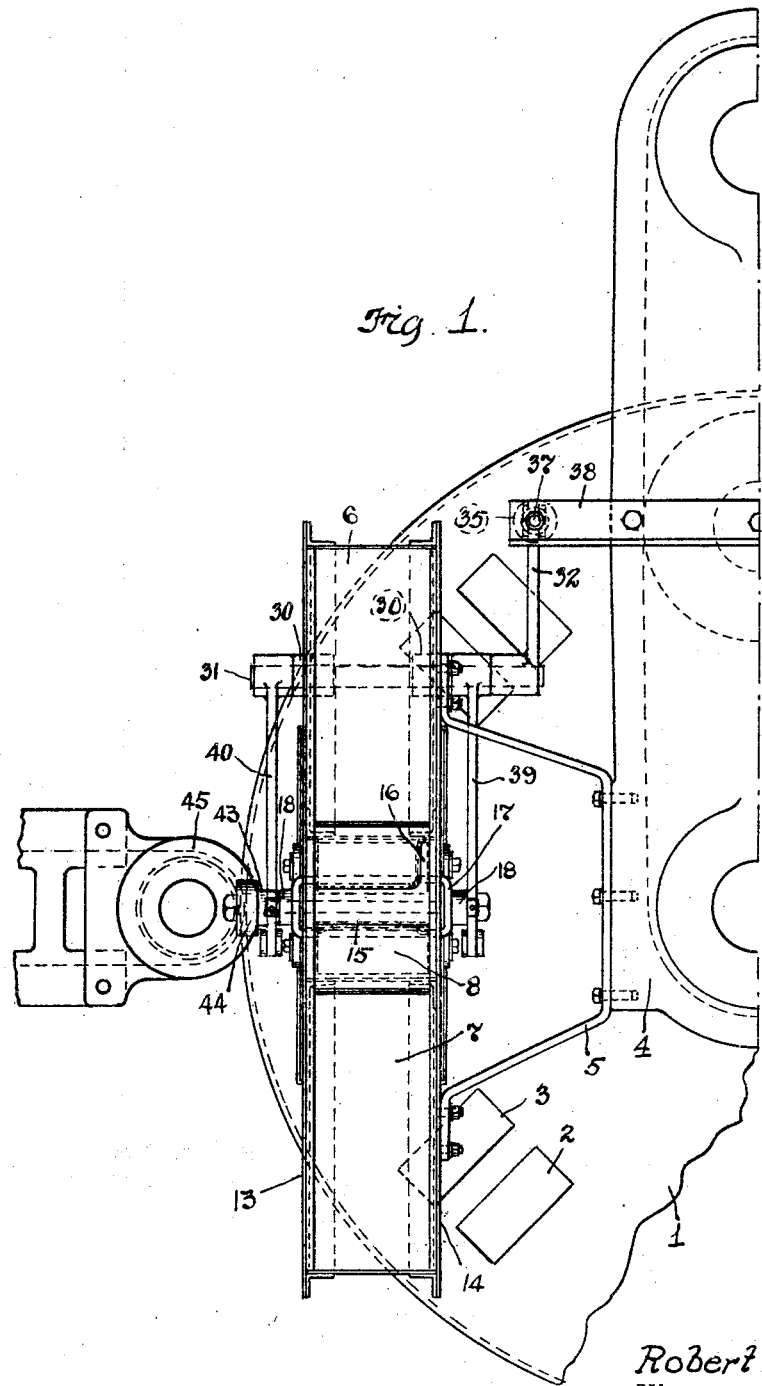

Aug. 16, 1932.   R. B. STUCKEY   1,872,521
MECHANISM FOR FEEDING DISSIMILAR MATERIAL TO MOLDS IN BRICK PRESSES
Filed May 16, 1930   6 Sheets-Sheet 2
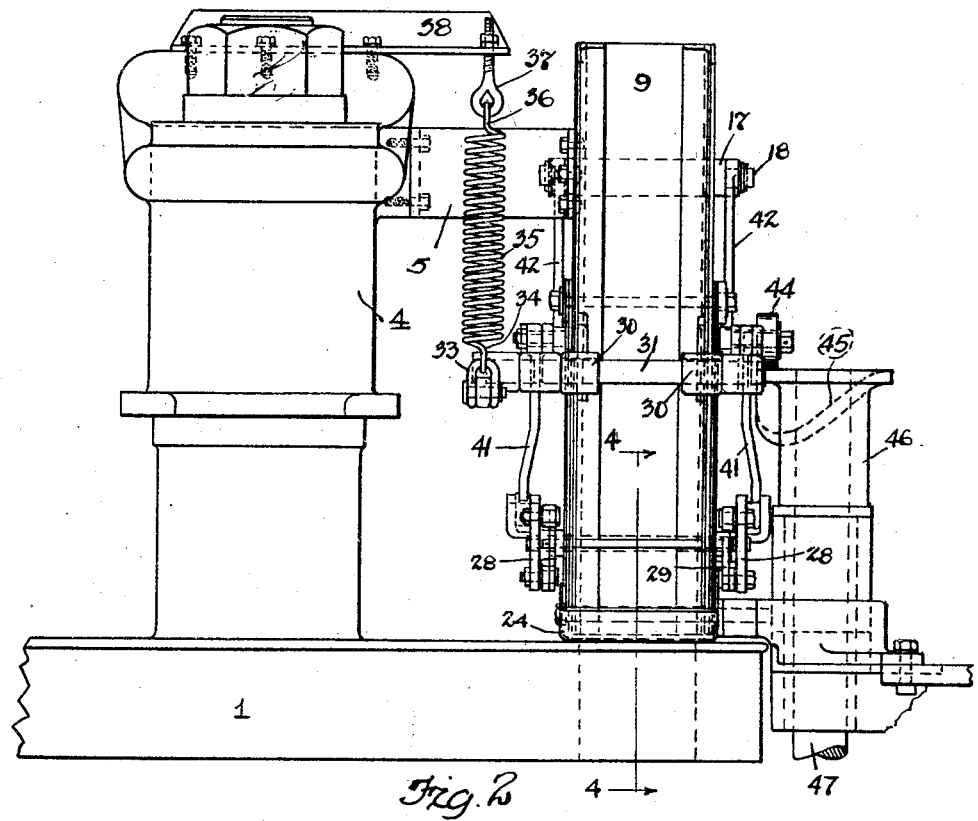
Fig. 2
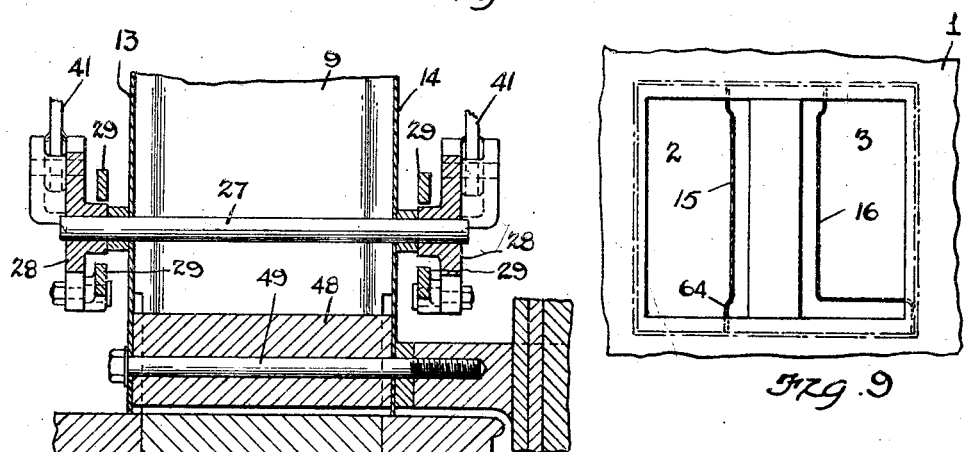
Fig. 5
Fig. 9
INVENTOR.
Robert B. Stuckey
BY
Fay, Oberlin & Fay
ATTORNEYS Aug. 16, 1932.   R. B. STUCKEY   1,872,521
MECHANISM FOR FEEDING DISSIMILAR MATERIAL TO MOLDS IN BRICK PRESSES
Filed May 16, 1930   6 Sheets-Sheet 3

INVENTOR.
Robert B. Stuckey
BY
Fay, Oberlin & Fay
ATTORNEYS.

Patented Aug. 16, 1932

1,872,521

UNITED STATES PATENT OFFICE

ROBERT B. STUCKEY, OF BUCYRUS, OHIO, ASSIGNOR TO THE W. A. RIDDELL COMPANY, OF BUCYRUS, OHIO, A CORPORATION OF OHIO

MECHANISM FOR FEEDING DISSIMILAR MATERIAL TO MOLDS IN BRICK PRESSES

Application filed May 16, 1930. Serial No. 452,917.

This invention, relating as indicated to a mechanism for feeding dissimilar materials to molds, has specific reference to a mechanism adapted to feed dissimilar materials to the molds of a brick press for the purpose of forming bricks having a veneered surface.

The method of making veneered bricks as heretofore employed consisted in coating a preformed brick with a suitable compound, such as paint, and then firing same in an endeavor to secure a permanent brick structure. Another method commonly employed consisted in partially filling the brick mold with the material forming the body of such brick and then filling the remaining portion of the mold cavity with the material comprising the veneering surface. The above outlined methods and many others which have been tried unsuccessfully produce a veneered brick which is inferior in quality and which is incapable of withstanding erosion, to which bricks are usually subjected during use. A disadvantage of forming bricks by the method including the application of a superficial coating of paint, and the like, before firing, was that such coating did not properly adhere to the body of the brick and consequently peeled during use, making the use of such brick undesirable where a permanent structure was sought to be attained. One of the disadvantages of the method of forming veneered brick by placing a thin layer of the veneering material on top of the body material prior to the pressing operation was that there was no relative movement of the veneering layer with respect to the wall of the mold cavity, so that, when the brick was removed, a rough surface of the veneered layer resulted. Another disadvantage of the method of so forming veneered brick was the multiple operation necessary to accomplish the desired result and the unevenness of the quality of the resulting finished product.

It is among the objects of my invention to provide a mechanism for the purpose of feeding dissimilar materials to brick molds in the manufacture of veneered brick which shall have none of the above named undesirable characteristics. By employing the mechanism comprising my invention, the operation of filling the mold with the material forming the body of the brick, and the material forming the veneering surface is accomplished by a single operation and, by employing the mechanism comprising my invention, the dissimilar materials are fed to the mold cavity so that, upon a pressing of such material, a relative movement of the veneering layer with respect to the wall of the mold cavity takes place, so that a smooth finished product will result.

In any of the above described methods of forming veneered brick as heretofore employed, considerable difficulty was experienced in the formation of bricks having more than one veneered surface, that is, in bricks having the end as well as the side thereof veneered so that such bricks could be employed in corners and around windows and in buildings and in similar types of construction. By employing the mechanism comprising my invention, the veneering of a plurality of sides of the brick may be accomplished in the same operation and with equal expediency. Other objects of my invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 3:
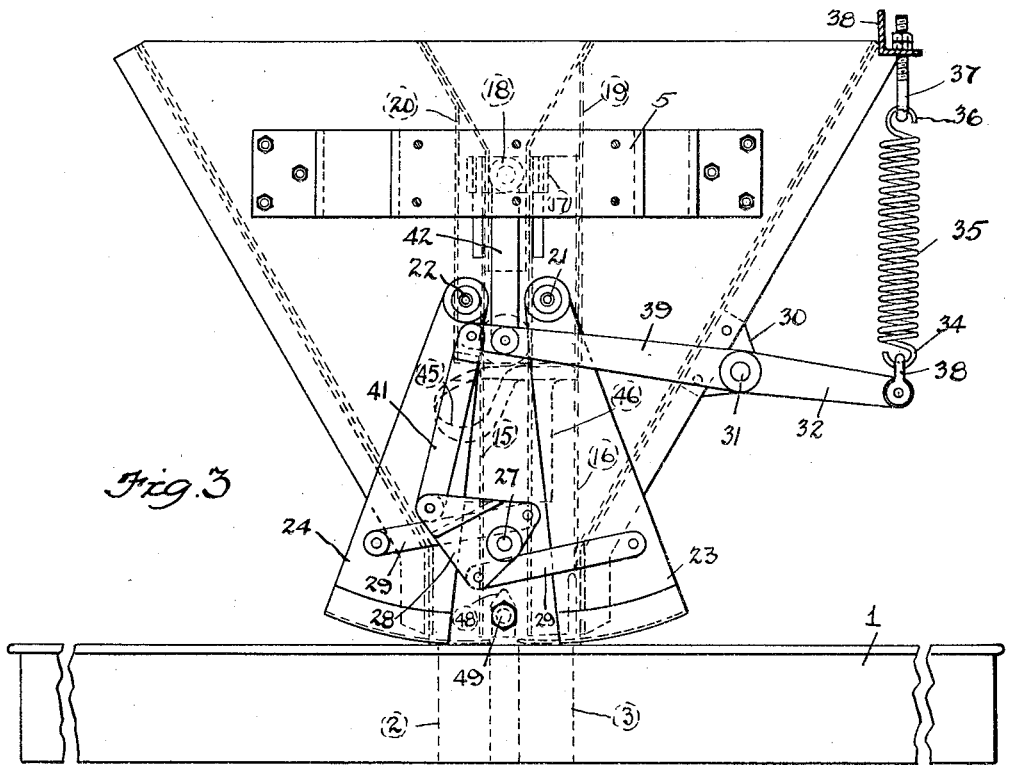
Figure 4:
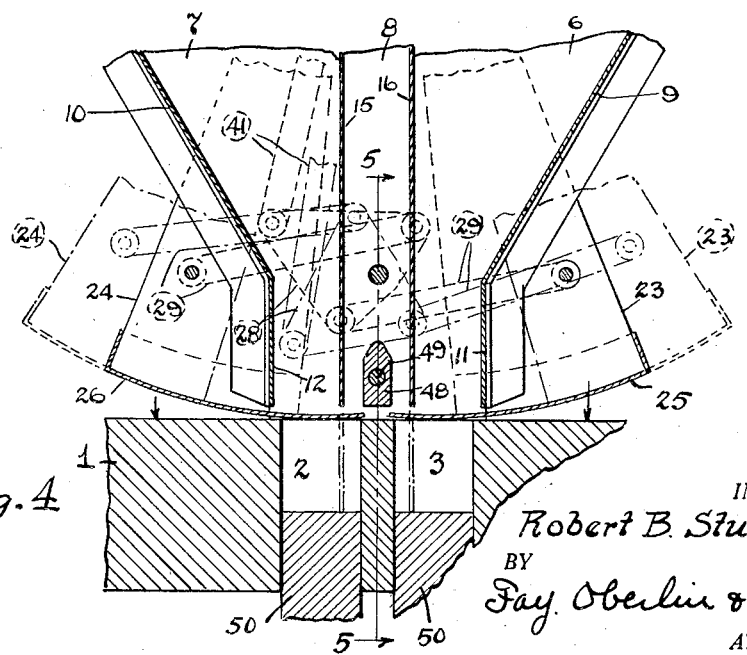
Figure 6:
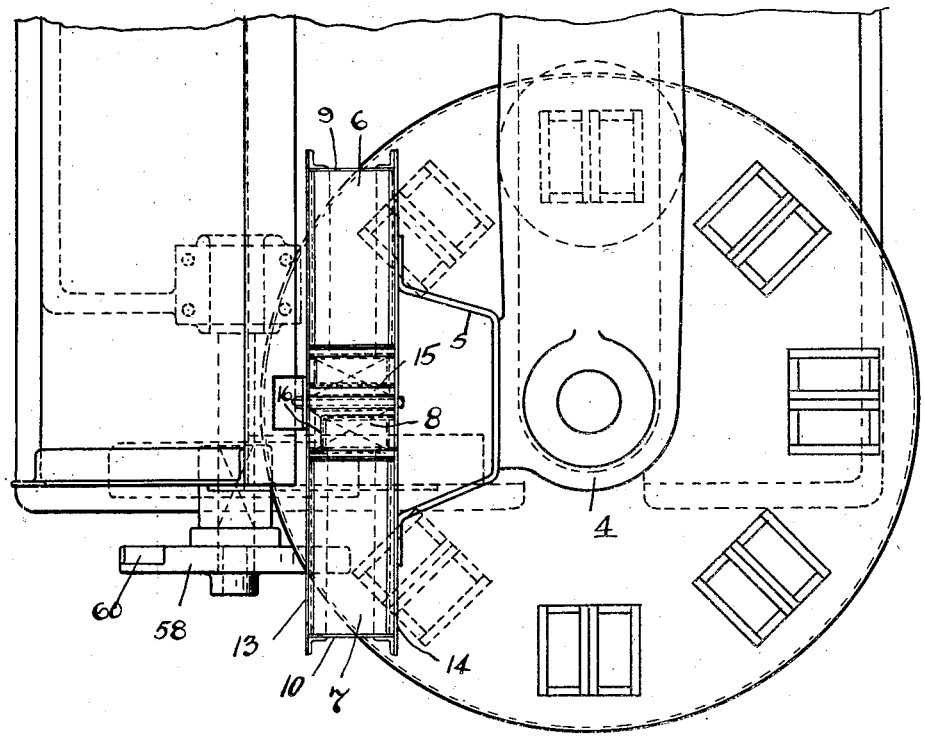
Figure 7:
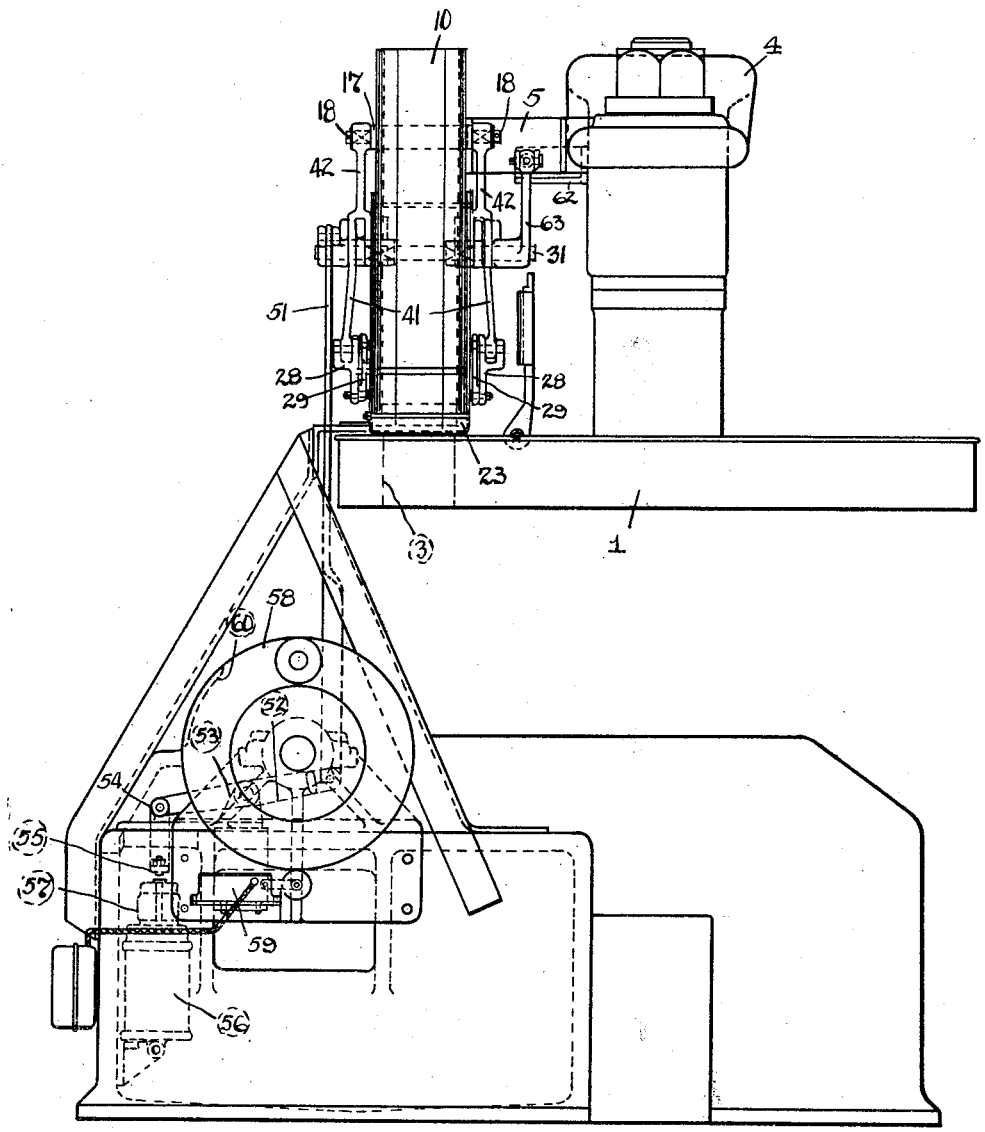
Figure 8:
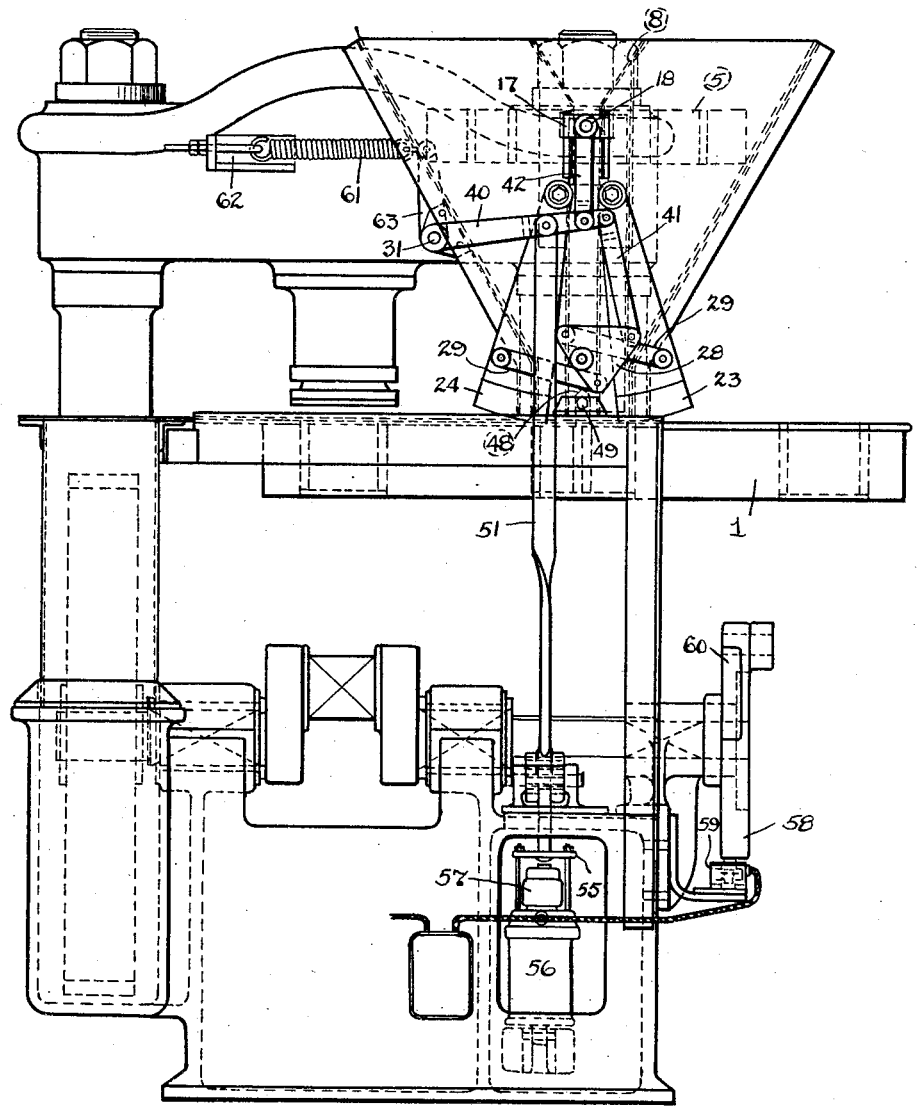

In said annexed drawings:

Fig. 1 is a fragmentary plan view of a portion of a rotary brick press showing associated therewith one form of the mechanism comprising my invention; Fig. 2 is a fragmentary elevational view of the mechanism illustrated in Fig. 1; Fig. 3 is a broken part sectional, part side view of the structure illustrated in Fig. 2; Fig. 4 is a fragmentary transverse sectional view of a portion of the structure illustrated in Fig. 2 taken on a plane substantially indicated by the line 4—4; Fig. 5 is a framentary transverse sectional view of the structure as illustrated in Fig. 2, taken on a plane substantially indicated by the line 5—5 in Fig. 4; Fig. 6 is a fragmentary plan view of a brick press similar to that fragmentarily illustrated in Fig. 1, showing associated therewith a structure comprising a modification of the mechanism of my invention; Fig. 7 is a fragmentary end elevational view of a structure illustrated in Fig. 6; Fig. 8 is a side view of the structure illustrated in Figs. 6 and 7; and Fig. 9 is a fragmentary part sectional, part plan view of the table carrying the mold cavity showing associated therewith the hoppers and partition members forming part of the structure comprising my invention.

Referring more particularly to the drawings and more especially to Figs. 1 to 5 inclusive, the brick press here shown for purposes of illustration, comprises a rotary table 1 which has contained therein paired mold cavities 2 and 3. For the purpose of convenience of description, my invention will be described as associated with a rotary mold table although it should be noted that the mold feeding mechanism about to be described, is equally applicable to presses other than the type illustrated for purposes of convenience. The central standard 4 of the brick press has a bracket 5 secured thereto and laterally extending therefrom, which bracket at its outer terminals serves to support the hopper structure about to be described.

The hopper structure comprising my invention includes two relatively large hoppers 6 and 7 intermediately of which is a smaller hopper 8. The hoppers 6 and 7 have their lateral walls 9 and 10 converging outwardly above the lower substantially vertical portions 11 and 12, so that an abundance of material will be available at all times during the feeding operation. The inner hopper 8 has for its front and rear walls, the walls 13 and 14, which are common to all three of the hoppers, namely 6, 7 and 8. The lateral walls 15 and 16 of the hopper 8 have secured thereto, as most clearly shown in Fig. 1, a substantially rectangular frame 17 which has its terminals 18 provided with gudgeons for the purpose hereinafter more fully explained. Bridging the walls 13 and 14 are partition members 19 and 20 which extend for some distance down into the hoppers 6 and 7 so as to prevent a packing of the material contained in such hoppers against the movable walls 15 and 16 of the inner hopper 8, and so prevent an interference of such material with the actuating mechanism of the hopper which is mounted in the walls 13 and 14 in this area. The walls 13 and 14 support transversely extending shafts 21 and 22 which extend for a short distance out of such walls, and have terminally mounted thereon the terminals of clam shell buckets 23 and 24. The bottoms of the buckets 23 and 24 are provided with substantially arcuate members 25 and 26 which normally extend inwardly toward the center of the hoppers and consequently close the delivery ends thereof.

Mounted in the walls 13 and 14 of the hoppers is a shaft 27 which extends transversely therethrough and therefrom for a short distance on both sides and has premanently secured thereto bell cranks 28. The bell cranks 28 have oscillably mounted thereon arms 29 which, at their other terminals, are oscillably secured to the clam shell buckets 23 and 24.

Oscillably mounted in bearing brackets 30 on the outer angle corners of the hopper 6 is a shaft 31, which has rigidly secured thereto an arm 32. A hook 33 which is oscillably mounted on the terminal of the arm 32, secures one terminal 34 of a retractile spring 35 which is at its other terminal 36 secured to a bolt 37 anchored in bracket 38 rigidly mounted on the frame of the brick press. The shaft 31 has likewise rigidly secured thereto, arms 39 and 40 which, in turn, have oscillably secured thereto links 41 and 42 which are respectively at their other terminals oscillably mounted on the bell cranks 28 and the gudgeons 18 of the member 17. The shaft 43, by means of which the arm 40 is secured to one of the links 42 has terminally mounted thereon, a roller 44 which rides on the face 45 of a cam element 46 driven by shaft 47.

Mounted in the discharge end of the hopper 8 and extending preferably across the space between walls 13 and 14 is a wedge-like member 48 which is secured to such walls by means of a bolt 49. The rotary table 1, as hereinbefore explained, has mold cavities 2 and 3 formed therein into which cavities from the bottom of the table extend pressure plungers 50 for the purpose of compressing the material fed to the molds in the manner hereinafter more fully explained.

By forming the partition member 16 in the form of an angle, as most clearly shown in Figs. 9 and 1, the bricks formed by the mold cavities placed in communication with this portion of the feed hopper, will be veneered on the side and end in contradistinction to the formation of the veneering layer on one side only as affected by the form of the partition member 15.

Instead of employing a cam means as 46 for the purpose of actuating the hopper mechanism, I may, as most clearly illustrated in Figs. 6, 7 and 8, employ electro-magnetic means which will accomplish the desired result. In connection with the structures illustrated in Figs. 6, 7 and 8, it will be noted that the hopper mechanism is identical with that described in connection with the previous figures, the only change in the structure residing in the provision of actuating means for the hopper mechanism to displace the cam structure already described. Like reference ordinals will therefore be employed in connection with these figures to designate like parts previously described in connection with Figures 1 to 5 inclusive.

In the construction illustrated in Figs. 6 to 8, the arm 40 has oscillably secured thereto a connecting link 51 which is terminally secured to a rocker arm 52 which is pivoted on a fulcrum 53 mounted on the frame of the machine. The rocker arm 52 has at its opposite terminal secured thereto a link 54 which is, at its other terminal, secured to the reciprocating head 55 of a common form of electro-magnetically actuated hydraulic operator 56. It will be understood that the operator 56 forms no part of this invention and consequently will not be described in detail other than to mention in passing, that vertical reciprocation of the head 55 is secured by means of a piston slidably mounted in the cylinder of the operator, which piston is reciprocated by fluid forced from the space in the cylinder on one side thereof, to the space in the cylinder on the other side thereof, by means of a propeller mounted in an aperture in the head of such cylinder, which propeller is driven by means of a motor diagrammatically represented at 57.

To the terminal of the crank shaft of the brick press is secured a wheel 58 which circumferentially contacts with the lever of an electric switch 59 by means of which the electric circuit to the motor 57 is controlled. The wheel 58 has a peripheral groove 60 formed therein, which, when that portion of the wheel is adjacent the switch 59, permits the switch lever which contacts with the periphery of the wheel 58 to close the circuit to the motor 57 so that an energization thereof will be effected resulting in an actuation of the hopper mechanism through the means hereinbefore explained.

The operation of the mechanism comprising my invention may briefly be described as follows. The bottom portions 25 and 26 of the clam shell buckets 23 and 24 are normally in the position most clearly shown in Fig. 4, until one pair of molds in the rotatable table 1 are brought into feeding position directly beneath the discharge openings of the hoppers 6, 7 and 8. When the table has been rotated to this position, the cam means 46 or the wheel 58 will likewise be rotated synchronously with the table so that when the mold cavities are in such proper feeding position, the hopper controlling mechanism will be actuated in the following manner. The cam means 46 will be in such a position so as to permit the retractile spring 35 to rotate the shaft 31 in a counterclockwise direction which will cause a corresponding rotation of the arm 39. The arm 39, being terminally connected to the link 41, will cause a counterclockwise rotation of the bell crank 28 which, through the links 29, will cause the clam shell buckets 23 and 24 to be spread outwardly moving the terminals of the elements 25 and 26 outwardly, permitting the material in the hoppers to run freely into the mold cavities 2 and 3 positioned thereunder.

Simultaneously with the actuation of the clam shell buckets 23 and 24, the links 42 will be moved downwardly carrying with them the partition members or walls 15 and 16, so that such walls or partitions will extend into the mold cavities as illustrated by the broken lines in Fig. 4. After the feeding operation has been completed, a further rotation of the cam element 46 will cause the above described operation to take place in reverse order, so that the partition members 15 and 16 are retracted from the mold cavities 2 and 3 and the clam shell buckets 23 and 24 with their associated closure members 25 and 26 draw into operable engagement with the delivery ends of the hoppers 6, 7 and 8, preventing any further discharge of material therefrom. The operation of the mechanism as actuated by the means specifically illustrated in Figs. 6, 7 and 8, is identical with that just described in connection with the mechanism actuated by the cam means 46, the only difference being that the actuating arm 51 is moved downwardly under the counteraction of the reciprocating head 55 of the hydraulic operator 56, this downward movement of the arm 51 accomplishing the spreading of the clam shell buckets and the introduction of the partition members 15 and 16 to the mold cavities in the manner hereinbefore described. In connection with this modified form of construction, it should be noted that the mechanism is returned to the starting position under the influence of the retractor spring 61, when the motor 57 of the hydraulic operator 56 has been de-energized upon rotation of the wheel 58. The retractor spring 61 is secured to a bracket 62 at one end which is secured to the frame of the press, and at its other end is secured to an arm 63 secured to a shaft such as 31, on which is rigidly secured the arm 40.

It will be noted, in connection with the above described mechanism, that the material comprising the veneering layer on the finished brick is fed by means of the central hopper 8, whereas the material forming the body of the brick is fed by means of the outer hoppers 6 and 7. By forming the lateral edges of the partitions 15 and 16, especially the lower terminals thereof which extend into the mold cavities in the manner most clearly illustrated in Fig. 9; that is, by having the edges thereof rebent as at 64, an abundance of veneering material will be introduced in the corners of the bricks which might otherwise be deficient in such veneering material due to the relatively small area to which such material must be introduced.

For the purpose of convenience in description, I have illustrated one partition member, namely 15, so formed as to produce a brick in the mold cavity 2 having a veneered surface only on one side, whereas the other partition member, namely 16, is formed so as to produce a brick in the mold cavity 3 having a veneered surface on the side and end. If the mechanism as illustrated were to be employed in actual production, every other brick would be formed with a veneered surface on one face, and every other brick as formed would be provided with a veneered surface on one face and one end. I have illustrated this form of construction merely to bring out the constructions possible for effecting a veneering of more than one face of the brick, although it is to be noted that any combination of partitions, such as 15 and 16, may be employed with the above described mechanism.

As above indicated, when the material is fed to the mold cavities 2 and 3 by the mechanism comprising my invention, the veneering material will be introduced to the mold in a vertically disposed layer, so that, after the molds have moved out from under the feeding hoppers and the material therein is being compressed under the action of the plungers 50, a relative movement of such layer of veneering material with respect to the side of the mold cavity will take place, resulting in a smooth surface on such veneering layer. The extrusion of the bricks from the mold under a further action of the plungers will also effect a stroking of the sides of the brick on which the veneering material is placed, further insuring a smooth surface to such material.

A further description of the mechanism comprising my invention is believed unnecessary for those familiar with the art of brick manufacture, suffice it to say that numerous changes may be made from the preferred embodiment of my invention illustrated for purposes of description without departing from the principles of the construction thereof, and any such changes may be made to adapt such mechanism to presses other than the type with which it is shown in association in the accompanying drawings.

A detailed enumeration of the advantages of the mechanism comprising my invention is believed to be unnecessary since it is believed that such mechanism presents numerous obvious advantages which are so apparent that a reiteration thereof in this description is unnecessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a press, the combination of a mold, means for feeding different materials to said mold, and means adapted to enter said mold to maintain separate such material fed thereto.

2. In a mechanism of the character described, the combination with means including a mold cavity, of a plurality of feed hoppers adapted to be placed in communication with said mold cavity, and means adapted to enter said cavity and maintain separate the materials fed thereto by said hoppers.

3. In a mechanism of the character described, the combination with means including a mold cavity, of a plurality of feed hoppers adapted to be placed in communication with said mold cavity, and a partition adapted to enter said mold cavity and confine the material fed thereto by one of said hoppers to the end and side of said cavity.

4. In a mechanism of the character described, the combination with means including a mold cavity; of a pair of contiguous hoppers having a movable common wall, said wall having a longitudinal flange extending laterally therefrom; and means for moving said wall into and out of said mold cavity.

5. In a mechanism of the character described, the combination with means including a mold cavity, of a plurality of feed hoppers positioned above said cavity, means for placing said hoppers in feeding communication with said mold cavity, and means adapted to enter said mold cavity for maintaining separate the materials fed from said hoppers to said cavity.

6. In a mechanism of the character described, the combination with movable means including a plurality of mold cavities, of a plurality of contiguous hoppers adapted to simultaneously feed dissimilar materials to the same mold cavity, and means adapted to enter said cavity for maintaining separate the materials fed by said hoppers to said mold cavity.

7. In a mechanism of the character described, the combination with movable means including a mold cavity, of a plurality of contiguous hoppers positioned above said cavity, a partition adapted to enter said cavity and maintain separate the materials fed by said hoppers to said cavity, means for closing the delivery ends of said hoppers, and means for simultaneously actuating said partition and said closure means.

8. In a mechanism of the character described, the combination with movable means including a mold cavity, of a plurality of contiguous hoppers positioned above said cavity, a partition adapted to enter said cavity and maintain separate the materials fed by said hoppers to said cavity, means for closing the delivery ends of said hoppers, and means including a cam for simultaneously actuating said partition and said closure means.

9. In a mechanism of the character described, the combination with movable means including a mold cavity, of a plurality of contiguous hoppers positioned above said cavity, a partition adapted to enter said cavity and maintain separate the materials fed by said hoppers to said cavity, means for closing the delivery ends of said hoppers, and electromagnetically actuated means for simultaneously actuating said partition and said closure means.

10. In a mechanism of the character described, the combination with means including a mold cavity; of a pair of contiguous hoppers having a common wall, said wall being movable and adapted to enter said mold cavity and maintain separate the materials fed by said hoppers to said mold cavity; and means adapted to move said wall in the manner described.

11. In a mechanism of the character described, the combination with means including a mold cavity, of a pair of contiguous hoppers having a movable common wall adapted to enter said mold cavity and maintain separate the materials fed thereto, means adapted to close the delivery end of said hoppers, and means for simultaneously actuating said movable wall and said closure means.

12. In a mechanism of the character described, the combination with means including a mold cavity, of a pair of contiguous hoppers having a movable common wall adapted to enter said mold cavity and maintain separate the materials fed thereto, means adapted to close the delivery end of said hoppers, control means interconnecting said movable wall and said closure means, and cam means for actuating said control means.

13. In a mechanism of the character described, the combination with means including a mold cavity, of a pair of contiguous hoppers having a movable common wall adapted to enter said mold cavity and maintain separate the materials fed thereto, means adapted to close the delivery end of said hoppers, control means interconnecting said movable wall and said closure means, and electro-magnetic means for actuating said control means.

14. In a mechanism of the character described, the combination with a rotatable table having circularly spaced mold cavities therein, of a plurality of feed hoppers adapted to be placed in communication with said mold cavities as the same are positioned thereunder, a partition adapted to enter said mold cavities when the same are in the filling position, and means for closing the delivery ends of said hoppers as the molds are moved away therefrom.

15. In a mechanism of the character described, the combination with a rotatable table having circularly spaced mold cavities therein, of a pair of feed hoppers having a common movable wall positioned above said table, closure means for the delivery ends of said hoppers, and means adapted to open said closure means and move said wall into a mold cavity as the same is positioned under said hoppers.

16. In a mechanism of the character described, the combination with a rotatable table having a plurality of paired mold cavities therein, of a hopper positioned above said table and adapted to be placed in communication with said paired molds, a second hopper having movable lateral walls positioned within said first named hopper, and means for moving said walls downwardly into each of said paired molds.

17. In a mechanism of the character described, the combination with a rotatable table having a plurality of paired mold cavities therein, of a hopper positioned above said table and adapted to be placed in communication with said paired molds, a second hopper having movable lateral walls positioned within said first named hopper, means for closing the delivery ends of said hoppers, means for moving said walls downwardly into each of said paired molds, and cam means for simultaneously actuating said closure means and said wall moving means.

18. In a mechanism of the character described, the combination with a rotatable table having a plurality of paired mold cavities therein, of a hopper positioned above said table and adapted to be placed in communication with said paired molds, a second hopper having movable lateral walls positioned within said first named hopper, means for closing the delivery ends of said hoppers, means for moving said walls downwardly into each of said paired molds, and electromagnetic means for simultaneously actuating said closure means and said wall moving means.

Signed by me this 13th day of May, 1930.

ROBERT B. STUCKEY.